US006721617B2

(12) United States Patent
Kato et al.

(10) Patent No.: US 6,721,617 B2
(45) Date of Patent: Apr. 13, 2004

(54) PACKAGE AND MAIL DELIVERY SYSTEM

(76) Inventors: Kiroku Kato, 3611 Oakes Dr., Hayward, CA (US) 94542; Thiet Pham, 2682 Glen Hardy Ct., San Jose, CA (US) 95148

(*) Notice: Subject to any disclaimer, the term of this patent is extended or adjusted under 35 U.S.C. 154(b) by 0 days.

(21) Appl. No.: 09/389,001

(22) Filed: Sep. 2, 1999

(65) Prior Publication Data

US 2003/0014143 A1 Jan. 16, 2003

Related U.S. Application Data

(63) Continuation of application No. 08/904,891, filed on Aug. 1, 1997, now Pat. No. 5,971,587.

(51) Int. Cl.[7] ............................................... G06F 19/00
(52) U.S. Cl. .................... 700/115; 700/225; 700/226; 340/825.3; 340/825.35; 340/825.54
(58) Field of Search ................................. 700/115, 225, 700/226, 228, 230; 340/825.54, 572.1, 568.1, 568.8, 825.3, 825.35

(56) References Cited

U.S. PATENT DOCUMENTS

| | | | |
|---|---|---|---|
| 3,438,489 A | 4/1969 | Cambornac et al. | 343/6.5 |
| 3,750,167 A | 7/1973 | Gehman et al. | 209/111.5 |
| 4,058,217 A | 11/1977 | Vaughan et al. | 209/74 M |
| 4,068,232 A | * 1/1978 | Meyers et al. | 343/6.8 R |
| 4,663,625 A | * 5/1987 | Yewen | 340/825.54 |
| 4,942,534 A | 7/1990 | Yokoyama et al. | 364/468 |
| 5,153,842 A | 10/1992 | Dlugos, Sr. et al. | 364/478 |
| 5,239,167 A | 8/1993 | Kipp | 235/383 |
| 5,266,925 A | 11/1993 | Vercellotti et al. | 340/572 |
| 5,302,954 A | * 4/1994 | Brooks et al. | 342/44 |
| 5,317,309 A | 5/1994 | Vercellotti et al. | 340/825.54 |

(List continued on next page.)

FOREIGN PATENT DOCUMENTS

| | | |
|---|---|---|
| DE | 4002738 A | 8/1991 |
| DE | 4002738 A1 | 8/1991 |
| DE | 18616130 A | 10/1997 |
| DE | 19616130 A1 | 10/1997 |
| EP | 0697261 A | 2/1996 |

OTHER PUBLICATIONS

International Preliminary Examination Report mailed Nov. 11, 1999.

Written Opinion mailed Apr. 21, 1999.

International Search Report mailed Nov. 3, 1998.

*Primary Examiner*—Emanuel Todd Voeltz
(74) *Attorney, Agent, or Firm*—Parsons Hsue & de Runtz LLP

(57) ABSTRACT

At the shipping department of a company, contracted outlets or outlets of delivery companies, information concerning the shipper and receiver are written into a label having a memory, but no controller or energy source. The label has a transmitter and the label makes use of power supplied by RF query signals to fetch the information stored and transmits such information to a label reader located either in a portable recorder or at sorting locations. After the information is written into the label, the label is attached to the package. Upon being picked up, the label on the package is read by a portable recorder which transmits the information to a main computer. The packages are then delivered to local hubs of the receiving outlets where information in the labels of the packages are read and the packages sorted according to the information in the labels on the packages and the packages are then delivered to either a central hub and/or local distribution centers of the destinations, where the labels of the packages are then read and the packages sorted accordingly for ultimate delivery to the receiver. Tracking numbers and other delivery information may be retrieved at any point along the way either by portable recorder or at the sorting centers and transmitted to the main computer for tracking and response to inquiries.

31 Claims, 4 Drawing Sheets

U.S. PATENT DOCUMENTS

| | | | |
|---|---|---|---|
| 5,388,158 A | 2/1995 | Berson | 380/23 |
| 5,430,441 A * | 7/1995 | Bickley et al. | 340/825.54 |
| 5,448,110 A | 9/1995 | Tuttle et al. | 257/723 |
| 5,469,363 A | 11/1995 | Saliga | 364/478 |
| 5,478,991 A | 12/1995 | Watanabe et al. | 235/375 |
| 5,557,096 A | 9/1996 | Watanabe et al. | 235/492 |
| 5,627,517 A | 5/1997 | Theimer et al. | 340/572 |
| 5,684,705 A | 11/1997 | Herbert | 364/464.11 |
| 5,686,902 A | 11/1997 | Reis et al. | 340/825.54 |
| 5,767,804 A | 6/1998 | Murphy | 342/357 |
| 5,963,134 A * | 10/1999 | Bowers et al. | 340/572.1 |
| 5,971,587 A | 10/1999 | Kato et al. | 364/468.22 |
| 2003/0014143 A1 * | 1/2003 | Kato et al. | 700/115 |

* cited by examiner

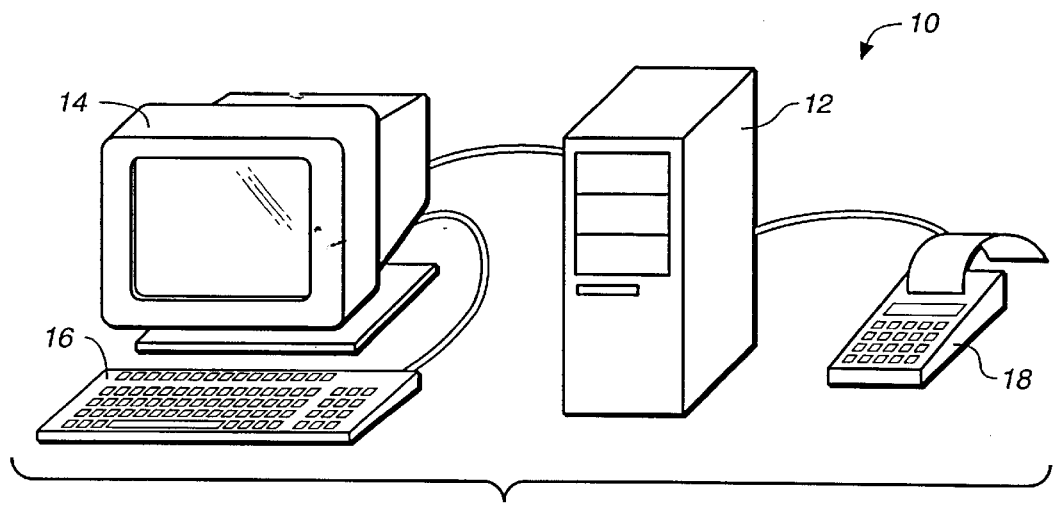
FIG._1A
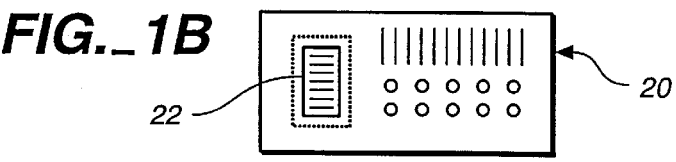
FIG._1B
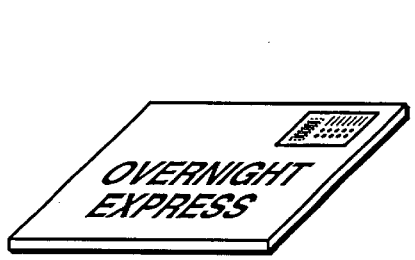
FIG._1C
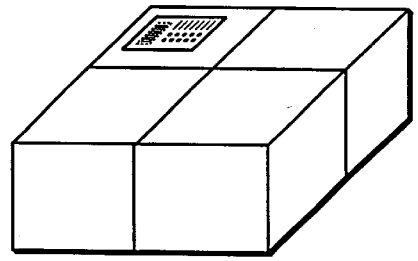
FIG._1D
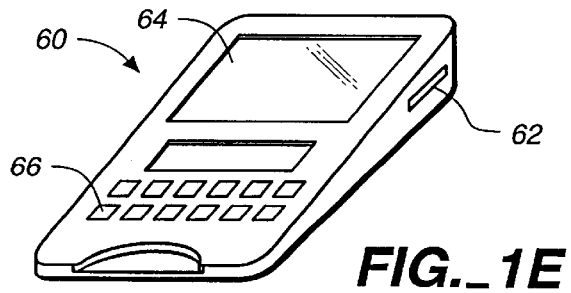
FIG._1E

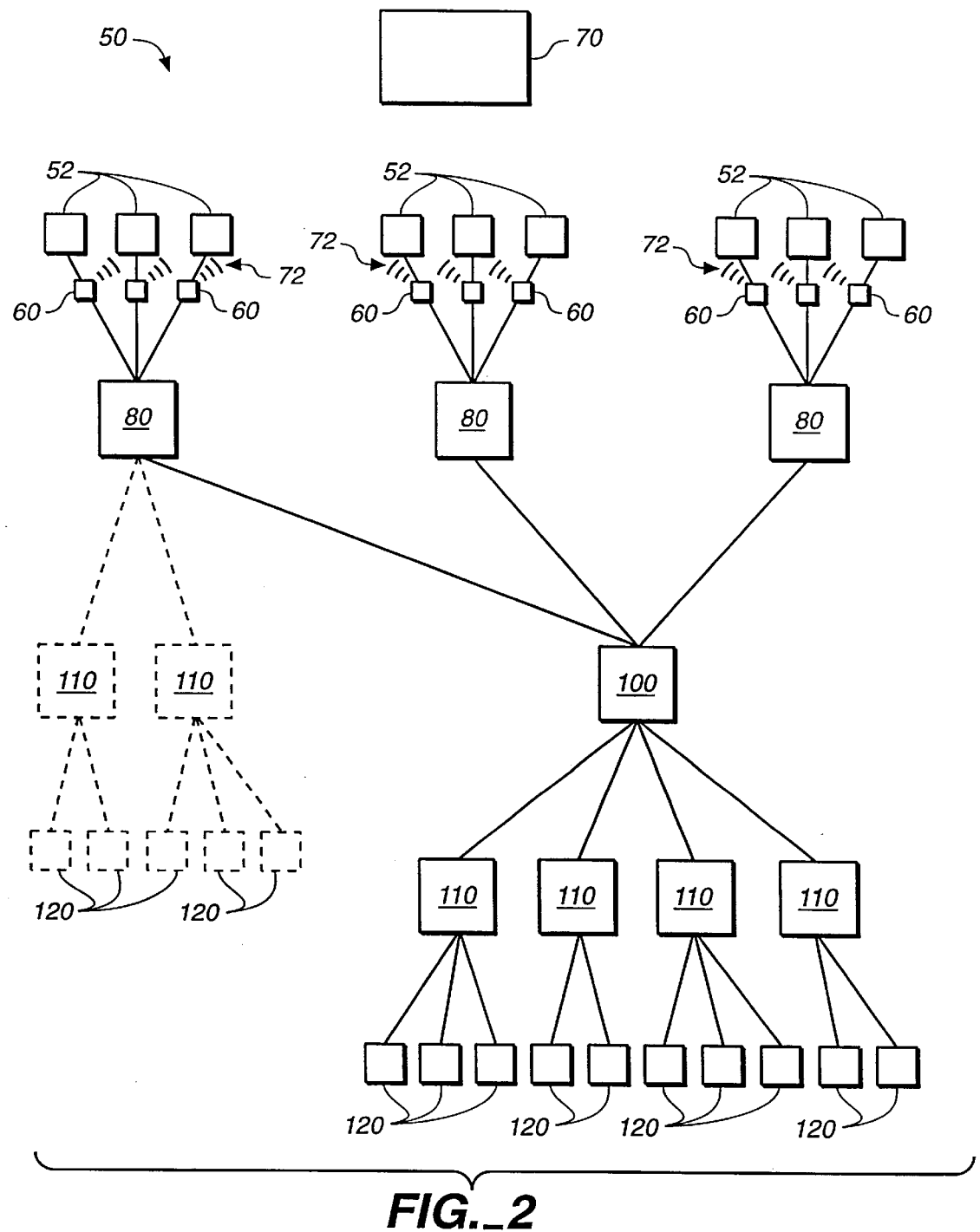
FIG._2

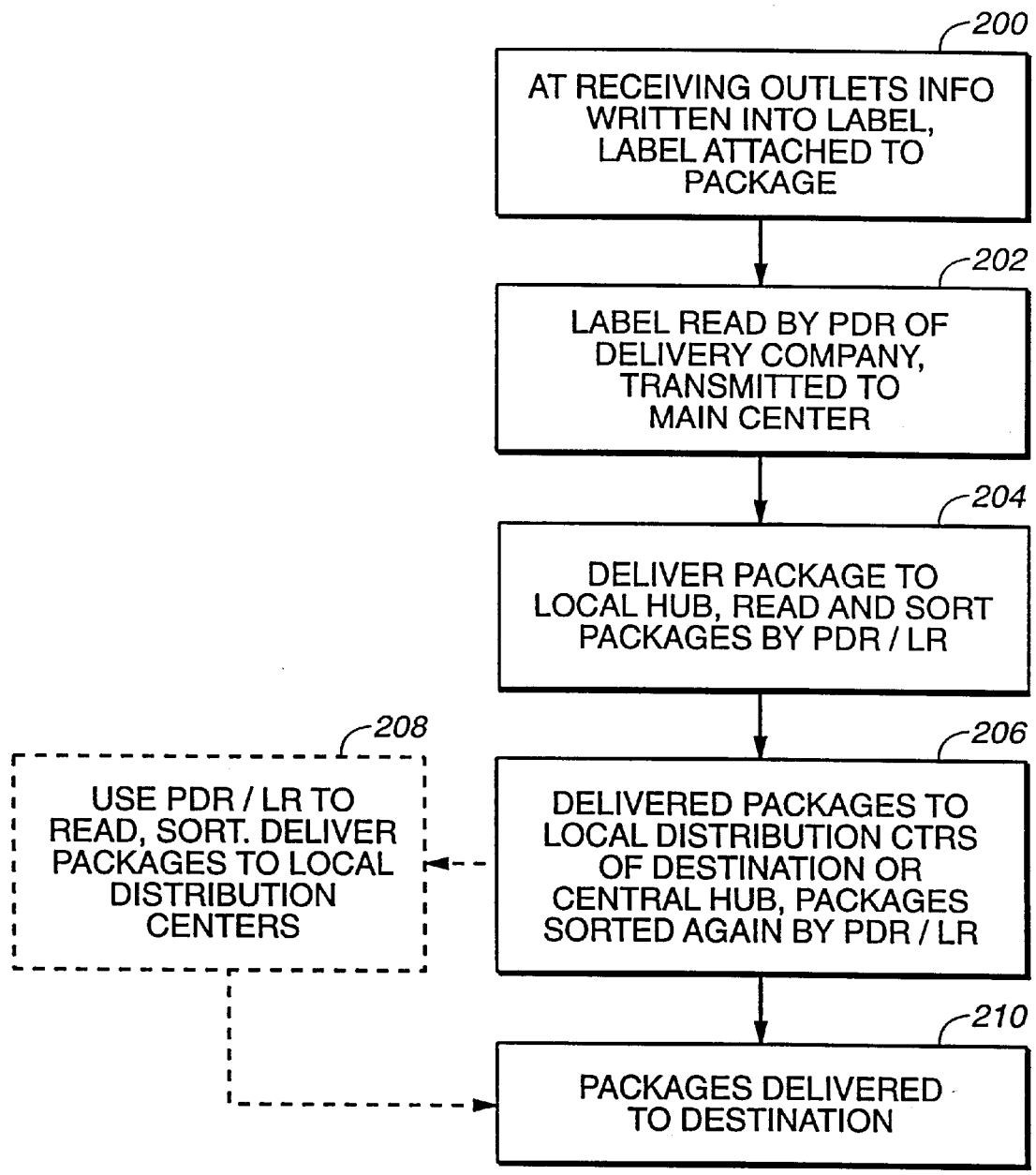
FIG._3

PACKAGE AND MAIL DELIVERY SYSTEM

This application is a continuation of Ser. No. 08/904,891 filed on Aug. 1, 1997 now U.S. Pat. No. 5,971,587.

BACKGROUND OF THE INVENTION

This invention relates in general to delivery systems and in particular to an improved package and mail delivery system.

In a conventional package delivery system, packages including parcels and envelopes are delivered in the following manner. The shipper of the parcel or envelope is identified and the shipper's name, telephone number and address as well as the receiver's name, telephone number and address are recorded on a delivery form. The delivery type, tracking number and other remarks such as COD and other special instructions are also recorded on the delivery form. After the above-noted information has been recorded on the delivery form, the form is placed onto or attached to each package. Some delivery forms have pre-printed barcodes, or a separate barcode label may be printed and placed onto or attached to the package. The barcodes may be used as tracking numbers also.

In a conventional package delivery system, packages are picked up by delivery companies from locations where the above-noted information is input into a computer for purposes such as invoicing and tracing. Tracking numbers on the delivery forms or on the separate barcode labels are read by a barcode scanner and transmitted to the central computer center for customer service, so that information of the whereabouts of the packages can be provided in response to customer inquiry. The packages are typically sorted manually by having a person read the receiver's address on the delivery form of each package. After the packages have been sorted they are delivered by train, truck or plane, depending on the type of delivery specified on the delivery form, to the destination. On its way, the package may need to be sorted repeatedly by hand at different locations in a similar manner before it is delivered to the specified destination. During each step of the delivery process, the tracking number of each package may be read by a barcode scanner and transmitted to the central computer center.

The above-described conventional package delivery system is expensive and prone to errors. Since the sorting is done manually, a large number of people would have to be hired to sort the packages by means of the information entered on the delivery forms.

In view of the above disadvantages, alternatives have been proposed. In U.S. Pat. No. 5,153,842 for example, an integrated circuit package label and/or manifest system is proposed by Dlugos, Sr. et al. In this system, a battery or solar cell powered integrated circuit package label is attached to each package, where each label is used to store delivery information. After the package has been delivered, the label is detached and returned to the carrier, where some or all of the information in the label is read by a terminal and uploaded to a host computer for billing and analysis. The label is then reused.

While the proposed integrated circuit patched label of Dlugos, Sr. et al. described above is an improvement over the conventional system, the labels proposed by Dlugos, Sr. et al. are expensive since each of such labels requires a microprocessor and a battery or solar cell for powering the label. It is, therefore, desirable to provide a simpler design for the package delivery system which is simpler and inexpensive.

SUMMARY OF THE INVENTION

A first aspect of the invention is directed towards a method for tracking items in a package delivery system comprising writing into a plurality of storage labels, each of the labels associated with an item to be delivered, information concerning delivery of the items, said information useful for automated sorting and tracking the items along their passage to destinations; transporting the items and their associated labels; applying query signals to the labels to retrieve the information and causing said labels to provide said information by means of energy of the query signals received by the labels. The method further comprises sorting the items by means of the information retrieved and delivering the sorted items to destinations.

Another aspect of the invention is directed towards a system for tracking items in package delivery comprising a plurality of storage labels; means for writing into each of said plurality of storage labels, information concerning delivery of an associated item, said information useful for automated sorting and tracking the items along their passage to destinations; means for transporting the items and their associated labels and means for applying query signals to the labels to retrieve the information, said labels providing said information by means of energy of the query signals received by the labels. The system further comprises means for sorting the items by means of the information retrieved and means for delivering the sorted items to destinations.

BRIEF DESCRIPTION OF THE DRAWINGS

FIG. 1A is a perspective view of a host computer system with a label writer to illustrate the invention.

FIG. 1B is a front view of a label useful for illustrating the invention.

FIGS. 1C and 1D are perspective views of different types of packages that may be shipped using the system and method of this invention.

FIG. 1E is a perspective view of a label reader useful for illustrating the invention.

FIG. 2 is a schematic diagram of the various points in the dispersion chain of packages where the host computer, the label writer and/or the label reader of FIGS. 1A, 1B and 1E may be used for writing labels for attachment to packages, and tracking and sorting the packages to illustrate the invention.

FIG. 3 is a flow chart illustrating a preferred method of the invention.

For simplicity in description, identical components are identified by the same numerals in this application.

DETAILED DESCRIPTION OF THE PREFERRED EMBODIMENT

Figure 4:
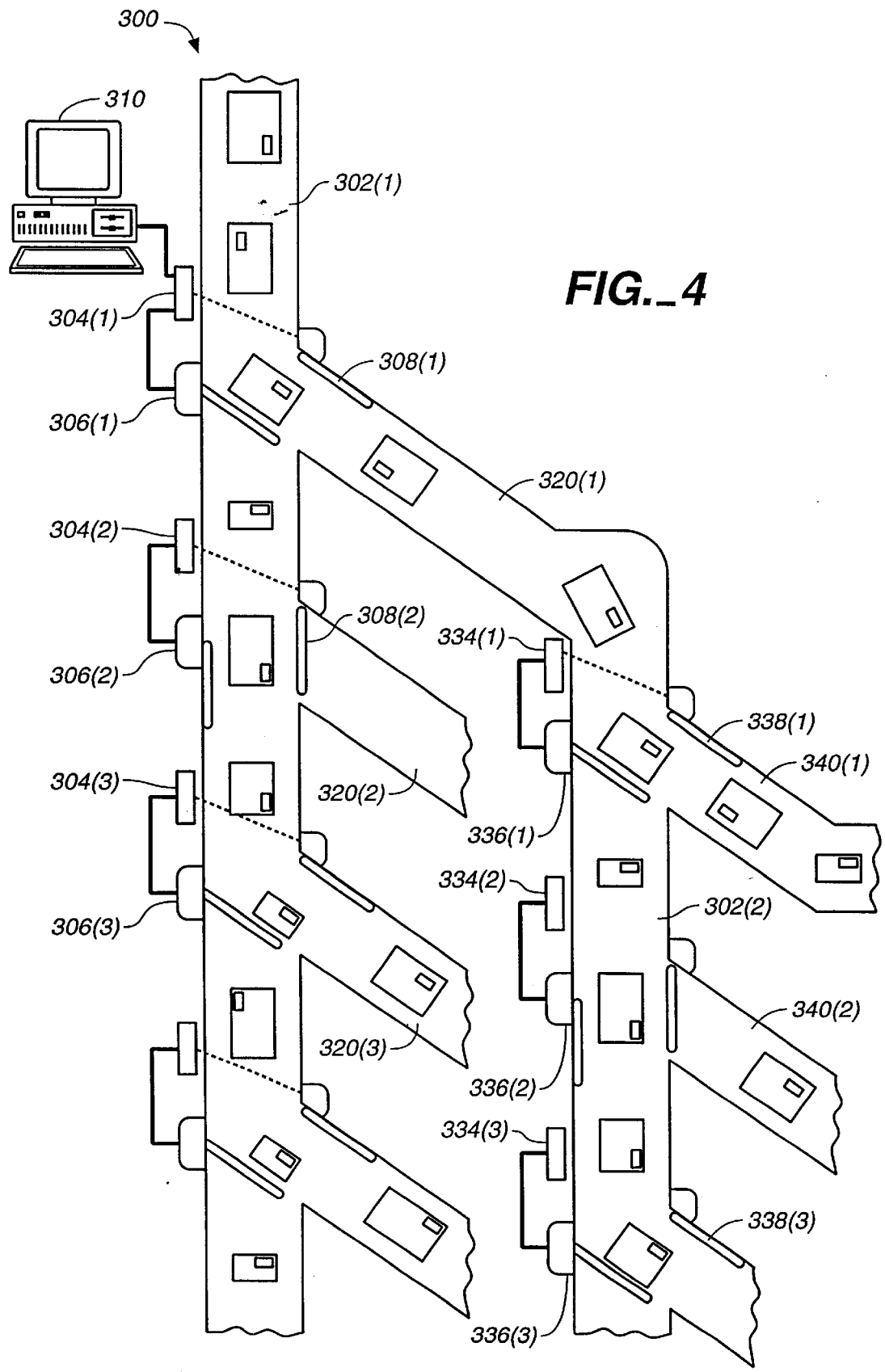
FIG. 4 is a schematic view of a sorting subsystem useful for illustrating this invention.

FIG. 1A is a perspective view of a host computer system with a label writer. FIG. 1B is a front view of a label which may be used for storing information about packages so that the packages may be sorted and tracked. The host computer system 10 includes a computer 12, monitor 14, keyboard 16 and a label writer 18. Label writer 18 is adapted for writing information into a label 20 of FIG. 1B, preferably by contact with the label 20. Information such as the name, address of the entity or person sending the package, and the receiver's name/address zip code may be input through the keyboard 16 or any other input device to computer 12 which causes the writer 18 to write such information into label 20. Other information such as tracking number, delivery type and class (special delivery, second day air, ground guaranteed, COD, etc.) and special instructions for delivery may also be recorded in label 20 through the computer system 10 and writer 18 in the same manner. All such information is stored in a memory in label 20. If desired, some or all of the information so stored may also be printed on label 20. Label 20 is a delivery label preferably constructed with an electronic device sandwiched between paper or plastic materials, and the bottom cover of the label has glue with peel-off paper. In this manner, after appropriate information has been input into the label (and printed on the label if desired) the paper is peeled off and the label 20 containing delivery information about a particular package is then glued onto such package, such as a package illustrated in FIG. 1C or 1D.

Information to be written into label 20 may also be conveyed to label writer 18 from sources other than a host computer; such and other implementations are within the scope of the invention.

In reference to FIG. 2, the above-described process using the host computer for writing information into the label 20 (and printing information on the label) may be performed at points such as outlets 52 of the dispersion system 50 in FIG. 2. Outlets 52 may be contracted outlets for receiving packages or the shipping departments of companies, government or other entities. These outlets are equipped with systems such as the computer system 10 of FIG. 1A for inputting the above-described information into label 20. After the appropriate information has been written into the labels and the labels attached to their respective packages, the packages at the outlets 52 are then picked up by one or more delivery companies. The package pick-up person from the delivery company carries a data recorder 60 of FIG. 1E, where recorder 60 includes a label reader 62. Preferably recorder 60 is portable so that the delivery person may carry it while making deliveries.

In reference to FIGS. 1E and 2, the label reader 62 reads the information stored in label 20 and stores such information read in a memory in recorder 60. The information read from the label may be displayed on the screen 64 and a keyboard 66 is provided for the package delivery person to input information. Recorder 60 preferably contains a microprocessor for controlling the storage of information from reader 62 and the input of information from a user. Recorder 60 preferably also includes a transmitter whereby information, including information read by reader 62 and that input by the delivery person, may be transmitted to a main computer center 70 through wireless communication, such as through radio frequency signals 72. This is illustrated in FIG. 2, where the delivery persons use readers 62 to read the labels on the packages they are delivering and use the recorders 60 to send such and other information to center 70 through signals 72 while such persons are on route between the outlets 52 and hubs 80.

Label reader 62, which may be battery powered, transmits a query signal to label 20 for reading the information therein. Label 20 contains a transmitter 22 and a memory for storing the information input by label writer 18. In the preferred embodiment, label 20 has no controller, processor or microprocessor of any kind, and also has no battery, solar cell or any other kind of energy source. Label 20 has the capability of using the energy of the query signal from label reader 62 or other sources for fetching the information stored in its memory and transmitting the information so fetched by transmitter 22 to the label reader 62. Label 20 may comprise an integrated circuit with memory, an antenna in the form of a coil, so that information may be recorded in the memory, fetched in response to query signals without its own energy source and transmitted by means of the coil. Labels of this type may be ordered with the above specifications from a number of semiconductor chip manufacturers, such as Indala, Inc. of San Jose, Calif.

In one embodiment, label reader 62 sends radio frequency query signals to label 20 and label 20 responds by transmitting radio frequency (RF) signals containing the information stored in label 20 to reader 62, using the energy of the query signals from reader 62. The label reader 62 contains a transceiver which transmits the query signals and receives information from the label 20 through wireless communication such as RF signals. Obviously, other types of wireless communication other than radio frequency signals may be used and are within the scope of the invention.

The delivery person delivers the packages preferably to a local hub 80 of the delivery company, where the labels on the packages are read and the packages sorted in accordance with the information stored in the attached labels; for example, the packages may be sorted in accordance with delivery classification, zip codes, cities, delivery class and so on. The sorting process is described in detail below in reference to FIG. 4. The reading of the information from the labels may be accomplished by a smart label reader 62 at the local hubs 80. The label reader 62 used may be part of the portable data recorder 60 used at the local hubs; alternatively, the label reader 62 may be stand alone devices stationed at such local hubs.

After the packages have been sorted at hubs 80, they are then delivered either to a central sorting hub 100 or directly to one or more local distribution centers 110 of the destination of the packages as shown in FIG. 2. At the central sorting hub and/or the distribution center 110, the packages are then again read by means of label reader 62 and sorted according to the information read. If the packages are delivered to a central sorting hub, they are then delivered to local distribution centers for corresponding destinations of the packages. At the local distribution centers, the packages are then loaded to a package delivery vehicle and delivered to the receivers or addressees 120 of the packages according to the name and address information stored in the labels. The tracking numbers and other delivery information of the packages can be read by the label reader 62 at any point between the outlets 52 and the receivers 120 by means of the label reader in a portable data recorder 60 carried by a delivery person at any delivery route between outlets 52 and receivers 120 and can be read by label readers 62 at the local hubs 80, the central hub 100 or the distribution center 110. Such information may be transmitted to the main computer center 70 at any time on route between outlet and receiver 120, to enable the packages to be tracked and traced if necessary.

The process of this invention is now illustrated in reference to FIG. 3. At the receiving outlets 52, information described above concerning the shipper and the receiver or addressee 120 is written into the labels 20 and the labels are then attached to the packages (block 200). The labels are then read by the portable data recorder of the delivery person from a delivery company and the information so read are then transmitted to the main computer center (block 202). The packages are then delivered to the corresponding local hub of the outlets, where information in the labels are again read by a portable data recorder or a stand alone label reader. Again, the information may be transmitted to the main computer center if desired for purposes of confirmation and tracking (block 204). After the labels on the packages are being read and the packages sorted using the information read (block 204), the packages are then delivered either directly to the local distribution centers 110 of the destinations or to a central hub 100 (block 206). In some situations, it may be desirable to deliver some of the packages to a central hub and other packages directly to a local distribution centers of the destinations. At the central hub and/or distribution centers, the labels on the packages are again read by means of the portable data recorders or stand alone label readers as described above (block 206), and the packages are sorted by reference to the information that has been read from the labels on such packages. If the packages are delivered to a central hub, then the packages will need to be delivered to local distribution centers of the destinations where information in the labels are again read so that the packages can again be sorted in an optional step (block 208). After the packages are sorted at the local distribution centers (blocks 206 and/or 208), the packages are then delivered from the distribution centers to the receivers or addressees at their destinations (block 210).

FIG. 4 is a schematic view of a subsystem for sorting packages or delivery items in accordance with this invention. As shown in FIG. 4, the sorting subsystem comprises two stages, each stage including a conveyor belt and associated label readers and gates. The first stage includes conveyor belt 302(1) for conveying the packages or delivery items 5 with labels that are used to store delivery information and attached to the items in the manner described above. Along side of the conveyor belt 302(1) is provided a row of n label readers 304(1), 304(2), . . . 304(n) collectively referred to as readers 304 and two sets of gates: n gates 306(1), 306(2) . . . , 306(n) collectively referred to as gates 306, where n is a positive integer, and n gates 308(1), 308(2) . . . , 308(n) collectively referred to as gates 308, where n is a positive integer. Label readers 304 are controlled by a host computer 310 which sends sorting instructions to the label readers 304.

Subsystem 300 also has a second stage comprising conveyor belt 302(2) and associated label readers 334(1), 334 (2), . . . , 334(n) collectively referred to as readers 334 and two sets of gates: n gates 336(1), 336(2), . . . , 336(n) collectively referred to as gates 336, and n gates 338(1), 338(2), . . . , 338(n) collectively referred to as gates 338, and receive items 5 from the first stage from paths 320(1), 320(2), . . . , 320(n) collectively referred to as paths 320.

The label readers in the first stage may, for example, receive instructions from the host computer 310 to sort the packages or items according to the delivery instruction classifications, such as overnight air, second day air and ground delivery. Thus, the first label reader 304(1) of the first stage may be instructed by the host computer to select all items that should be delivered by overnight air delivery, and the second label reader 304(2) may be instructed to select all items to be delivered by second day air delivery, and a third label reader 304(3) may be instructed to select all items to be delivered by ground delivery, for example. When label 304(1) reads the label of a package that passes it on the conveyor belt 302(1) and finds information in the label indicating overnight air delivery, label 304(1) would cause gate 306(1) (through a gate control forming a part of the gate) to close and gate 308(1) to open, so that the item so selected will be prevented from travelling any further along belt 302(1) but instead travel through gate 308(1) through a path 320(1) to conveyor belt 302(2). If label reader 304(1), upon reading the information in the label of an item passing by that such item is to be delivered other than by overnight air delivery, label reader 304(1) will not cause gate 306(1) to close or gate 308(1) to open, so that such item will be transported by conveyor belt 302(1) to label reader 304(2). Label reader 304(2) will then read the information on the label of the item to find out if such item should be delivered by second day air delivery. If the information so indicates, label reader 304(2) will then cause gate 306(2) to close and gate 308(2) to open, causing the package to stop travelling on belt 302(1) and travel down path 320(2) to belt 302(2).

The second stage of subsystem 300 comprises conveyor belt 302(2) and the associated label readers 334, gates 336 and 338 which operate in a manner substantially similar to that of the first stage, but with label readers 334 comprising readers 334(1), 334(2) . . . , which are instructed by host computer 310 to sort by a different criteria than the first stage, such as by zip code. Thus, the first label reader 334(1) may be instructed to pick up or select items whose addresses have zip codes starting with a zero, the second label reader 334(2) may be instructed to pick up or select items with addresses whose zip code starts with one and so on. Paths 320(1), 320(2), . . . , 320(n) may simply be chutes where the items will simply slide along an inclined trough from the first stage to the second stage.

After sorting by the second stage, the packages or items 5 may slide down another set of chutes 340(1), 340(2), . . . ,340(n) to respective loading docks 350(1), 350(2), . . . , 350(n) at which the packages or items 5 are loaded onto delivery trucks for delivery. Obviously, additional sorting stages may be included between the second stage and the loading docks, whereby the host computer will instruct label readers of such stage to further sort the delivery items, such as by city and neighborhood before the packages reach the loading docks. The host computer 310 collects information such as the number of items at each loading dock from the label readers and matches such information with the original information for further analysis.

The sorting can also be done by first sorting by country or state, followed by delivery classifications such as overnight air, second day air or ground, then by zip codes or other special instructions.

The above-described sorting system using label 20 enables fast and accurate sorting despite the size of the items. In conventional sorting using a barcode scanner, the scanner may need to re-focus to read the barcode attached to each item whenever the distances between the scanner and the barcode labels on the items change due to the different sizes of the items. Such re-focusing not only slows down the sorting process, but increases chances of mis-sorting. Furthermore, in order for the barcode scanner to read the barcode on the item, the item has to be oriented so that the label faces the scanner. This is not necessary when label 20 is read in the manner described above, so that the package 5 can be at any orientation with respect to the label reader.

While the invention has been described above by reference to various embodiments, it will be understood that different changes and modifications may be made without departing from the scope of the invention which is to be defined only by the appended claims and their equivalents.

What is claimed is:

1. A method for tracking items in a delivery system, comprising:

writing into a plurality of storage labels, said labels having transmitters, each of the labels associated with an item, the information concerning delivery of the items, said information in each label customized for its associated item and useful for automated sorting and tracking the item along their passage to destinations;
transporting the items and their associated labels;
applying query signals to the labels to retrieve the information and to cause said labels to provide said information through their transmitters, wherein said transmitters are caused to transmit said information by means of energy of the query signals received by the labels; and
sorting the items by means of the information retrieved.

2. The method of claim 1, wherein said applying causes the transmitters of said labels to transmit said information without using any energy source, controller or microprocessor in or associated with the labels.

3. The method of claim 1,, said applying step applying the signals by means of wireless communication.

4. The method of claim 1, said system having a plurality of local collection outlets, said writing step being performed at the outlets.

5. The method of claim 4, said system having a plurality of local collection hubs, each hub for collecting packages from a corresponding number of outlets, said transporting step transporting the items from said corresponding number of outlets to each of said hubs, said applying step applying the signals at the hubs, and said sorting step sorting the items at each of the hubs.

6. The method of claim 5, said transporting step transporting the items from one or more local hubs to a plurality of distribution centers or a central sorting hub, said applying and causing steps applying the signals to the items and causing the labels to provide said information at the centers or the central sorting hub, said sorting step sorting the items at the centers or the central sorting hub.

7. The method of claim 1, said Writing step writing into each label customized information related to name, address, telephone number or zip code related to destinations, and/or tracking number or special delivery instructions related to the item associated wit such label.

8. The method of claim 1, further comprising sending the information retrieved to a central computer for tracking the items.

9. The method of claim 1, wherein said writing step comprises contacting the labels by a label writer.

10. The method of claim 1, further comprising attaching the labels to their associated items after the writing step.

11. A system for tracking items for delivery comprising:
a plurality of storage labels labels, said labels having transmitters;
a recorder writing into each of said plurality of storage labels, information customized for an item associated with such label and concerning delivery of the associated item, said information useful for automated sorting and tracking the item along their passage to destinations;
an instrument transporting the items with their associated labels;
a device applying query signals to the labels to retrieve the information, said labels providing said information through their transmitters, wherein said transmitters are caused to transmit said information by means of energy of the query signals received by the labels; and
a sorter sorting the items by means of the information retrieved.

12. The system of claim 11, further comprising a plurality of collection hubs and distribution centers, said instrument transporting the items from the hubs to the centers, said device applying the query signals and receiving said information provided by the labels at the centers.

13. The system of claim 11, said recorder comprising a reader/writer and a host computer.

14. The system of claim 11, said device comprising one or more portable data readers each of which comprises a transceiver that transmits the query signals and receives said information from the labels through wireless communication.

15. The system of claim 11, further comprising a plurality of local collection outlets, said recorder being located at the outlets.

16. The system of claim 15, said system having a plurality of local collection hubs, each hub for collection packages from a corresponding number of outlets, said instrument transporting the items from said corresponding number of outlets to each of said hubs, said device applying the signals at the hubs, and said sorter sorting the items at each of the hubs.

17. The system of claim 11, further comprising a plurality of local hubs, said instrument transporting the items to the hubs, said device applying the query signals and receiving said information provided byte labels at the hubs.

18. The system of claim 17, said sorter sorting the items at the hubs using the retrieved information.

19. The system of claim 11, further comprising a plurality of distribution centers and a central hub, said instrument transporting the items from local hubs to the centers or the central hub, said device applying the query signals and receiving said information provided by the labels at the centers or the central hub.

20. The system of claim 11, wherein said labels include no energy source, or controller or microprocessor and are suitable for attachment to the items.

21. The system of claim 11, said recorder writing into each label customized information related to name, address, telephone number or zip code related to destinations, and/or tracking number or special delivery instructions related to the item associated with such label.

22. A method for tracking items in a delivery system, comprising:
writing into a plurality of storage labels at one or more receiving stations, said labels having transmitters, each of the labels associated with an item, said information in each label customized for its associated item and concerning delivery of the item, said information useful for automated sorting and tracking the items along their passage to destinations;
transporting the items and their associated labels to a local distribution center or central hub;
applying query signals to the labels to retrieve the information at the local distribution center or central hub and to cause said labels to provide said information through their transmitters, wherein said transmitters are caused to transmit said information by means of energy of the query signals received by the labels; and
sorting the items by means of the information retrieved.

23. The method of claim 22, wherein said transporting transports by means comprising delivery motor vehicles.

24. The method of claim 22, wherein said delivering delivers by means comprising delivery motor vehicles.

25. The method of claim 22, wherein said writing writes into each label customized information related to name, address, telephone number or zip code related to destinations, and/or tracking number or special delivery instructions related to the item associated with such label.

26. A system for tracking items for delivery comprising:
a plurality of storage labels, said labels having transmitters;

a recorder writing into each of said plurality of storage labels at one or more receiving outlets, information concerning delivery of an associated item, said information in each label customized for its associated item and useful for automated sorting and tracking the item along its passage to a destination;

an instrument transporting the items with their associated labels to a local distribution center or central hub;

a device applying query signals to the labels to retrieve the information at the local distribution center or central hub, said labels providing said information through their transmitters, wherein said transmitters are caused to transmit said information by means of energy of the query signals received by the labels;

a sorter sorting the items by means of the information retrieved.

27. The system of claim 26, wherein said instrument comprises delivery motor vehicles.

28. The system of claim 26, further comprising delivery motor vehicles delivering the sorted items to destinations.

29. The system of claim 26, said recorder writing into each label customized information related to name, address, telephone number or zip code related to destinations, and/or tracking number or special delivery instructions related to the item associated with such label.

30. A method for tracking items in a delivery system, each of the items associated with a storage label, said labels having transmitters and stored therein information concerning delivery of the items, said information in each label customized for its associated item and useful for automated sorting and tracking the items along their passage to destinations; comprising:

transporting the items and their associated labels;

applying query signals to the labels to retrieve the customized information and to cause said labels to provide said information through their transmitters, wherein said transmitters are caused to transmit said information by means of energy of the query signals received by the labels; and sorting the items by means of the customized information retrieved.

31. A system for tracking items in a delivery system, each of the items associated with a storage label, said labels having transmitters and stored therein information concerning delivery of the items, said information in each label customized for its associated item and useful for automated sorting and tracking the items along their passage to destinations; comprising:

an instrument transporting the items and their associated labels;

a device applying query signals to the labels to retrieve the customized information and to cause said labels to provide said information through their transmitters, wherein said transmitters are caused to transmit said information by means of energy of the query signals received by the labels; and a sorter sorting the items by means of the customized information retrieved.

* * * * *

UNITED STATES PATENT AND TRADEMARK OFFICE
CERTIFICATE OF CORRECTION

PATENT NO. : 6,721,617 B2
DATED : April 13, 2004
INVENTOR(S) : Kiroku Kato and Thiet Trung Pham It is certified that error appears in the above-identified patent and that said Letters Patent is hereby corrected as shown below:

Column 7,
Line 46, after "storage" delete "labels"
Line 33, before "step" delete "Writing" and insert -- writing --
Line 37, before "such" delete "wit" and insert -- with --

Column 8,
Line 21, before "labels" delete "byte" and insert -- by the --

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,721,617 B2
DATED        : April 13, 2004
INVENTOR(S)  : Kato et al.

It is certified that error appears in the above-identified patent and that said Letters Patent is hereby corrected as shown below:

Column 8,
Lines 58 amd 59, after "claim 22." delete "wherein said delivering delivers by means comprising delivery motor vehicles." and insert -- further comprising delivering the sorted items to destinations. --

Signed and Sealed this

Twelfth Day of October, 2004

JON W. DUDAS
*Director of the United States Patent and Trademark Office*